United States Patent

[11] 3,594,577

[72] Inventor George Christopher Loveday
 Southend-on-Sea, England
[21] Appl. No. 780,465
[22] Filed Dec. 2, 1968
[45] Patented July 20, 1971
[73] Assignee Ekco Electronics Limited
 Southend-on-Sea, England
[32] Priority Dec. 7, 1967
[33] Great Britain
[31] 55591/67

[54] INDICATING OR DETECTING APPARATUS FOR NUCLEAR RADIATION SUCH AS GAMMA RAYS
 13 Claims, 6 Drawing Figs.
[52] U.S. Cl............................................. 250/71.5,
 178/7.5, 250/83.3
[51] Int. Cl............................................. G01t 1/20
[50] Field of Search.................................. 250/71.5,
 83.3

[56] References Cited
 UNITED STATES PATENTS
2,666,145 1/1954 Eversole et al. ............... 250/71.5
2,829,264 4/1958 Garrison....................... 250/71.5
2,911,534 11/1959 Brannon, Jr. et al.......... 250/71.5
3,032,657 5/1962 Meier et al.................... 250/71
3,225,193 12/1965 Hilton et al.................... 250/71.5
3,308,296 3/1967 Cowan et al.................. 250/71.5

Primary Examiner—James W. Lawrence
Assistant Examiner—Davis L. Willis
Attorney—Beveridge & De Grandi ABSTRACT: A gamma ray indicating or detecting apparatus comprising a mosaic of scintillator elements adapted to produce scintillations, a plurality of scintillation detectors arranged to view the elements, the field of view of each detector extending over a plurality of the elements, and overlapping the field of view of neighboring detectors, each detector being adapted to produce a respective detector pulse in response to a scintillation detected thereby, the peak amplitude of the respective pulse being dependent on the position of the scintillation relative to the detector, the detectors being arranged in parallel rows with reference to a cartesian coordinate system, each row being defined by a respective constant value of one of said coordinates, the detectors being arranged in rows parallel to the elements, the outputs of the detectors in each row being respectively summed to provide a respective row output pulse, the said row output pulses having peak amplitudes falling within predetermined amplitude ranges, and being indicative of the position of the particular scintillation element in the mosaic in which any particular scintillation occurs.

PATENTED JUL20 1971 3,594,577

Inventor
GEORGE CHRISTOPHER LOVEDAY
By
Browne, Schuyler + Beveridge,
Attorneys

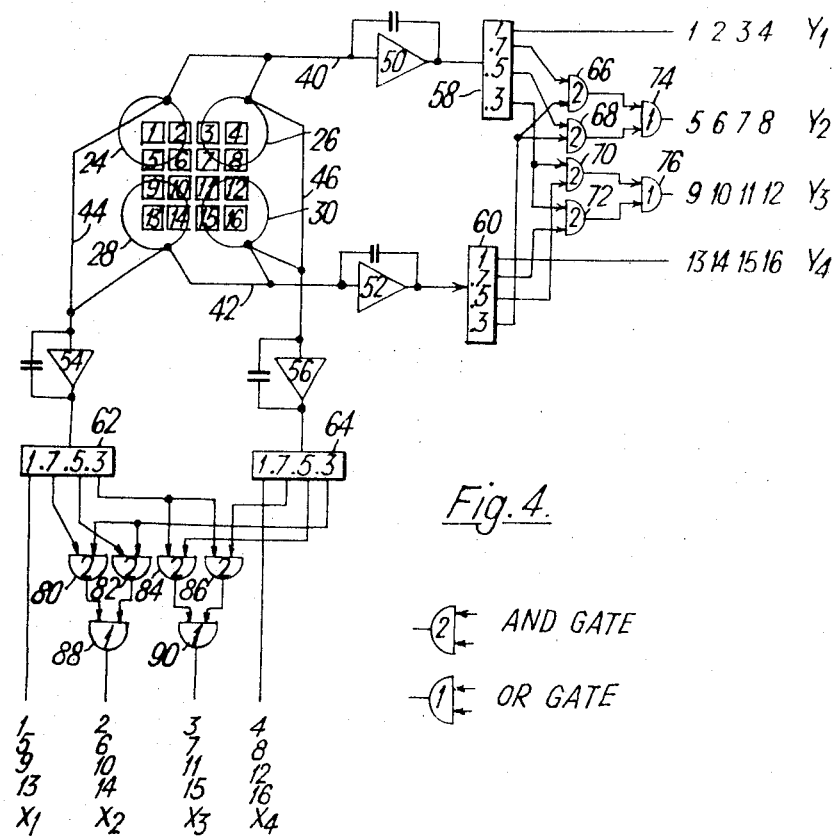
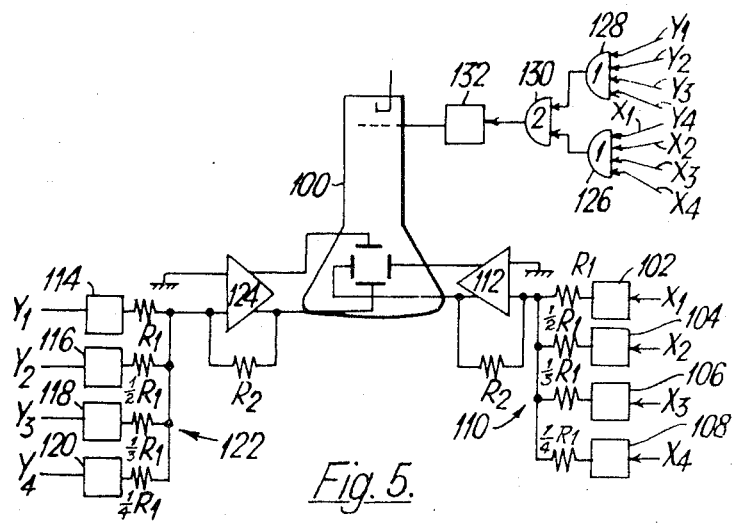

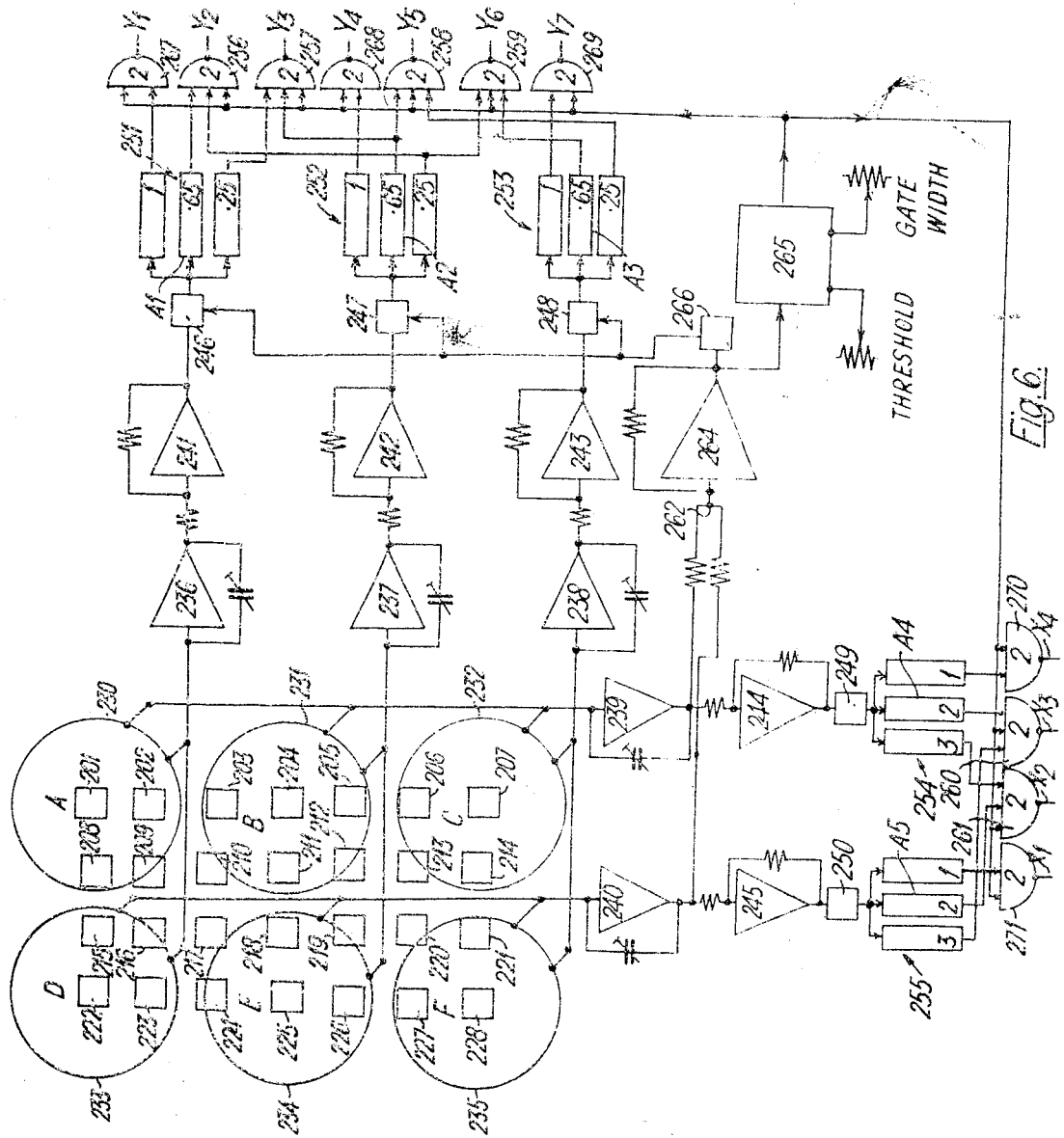

INDICATING OR DETECTING APPARATUS FOR NUCLEAR RADIATION SUCH AS GAMMA RAYS

This invention relates to indicating or detecting apparatus for nuclear radiation such as gamma rays, which term we shall use herein to include gamma rays and other forms of nuclear radiation which may be practically used with a crystal or phosphor producing scintillations when bombarded with such radiation.

More particularly the invention relates to such apparatus of the type in which only a selected intensity range of the scintillations is used.

According to the present invention, there is provided a gamma radiation indicating or detecting apparatus which utilizes a mosaic of scintillator crystal elements. Each element produces a scintillation of given intensity when a gamma ray of given energy is incident thereon. Means are provided for optically screening the elements from each other. The elements are arranged in a series of first rows parallel to a first axis and in a series of second rows or columns parallel to a second axis intersecting the first. A plurality of scintillation detectors are arranged to view the elements. The detectors are more widely spaced than the elements and are arranged in a series of first and second detector rows parallel to the first and second element rows. Summing means are provided to sum the outputs of the detectors in each detector row. Interpolator means are provided to process the summed outputs of each row of detectors in response to a scintillation of given intensity. The interpolator means provide an output signal having a first position pulse and a second position pulse which respectively define the first and second element rows containing the element in which said scintillation occurred.

The coordinate system may be a cartesian coordinate system, the first detector rows being parallel to the Y-axis thereof, the second detector rows being parallel to the X-axis thereof.

The interpolator means may have a plurality of first output channels, one for each first element row, and a plurality of second output channels one for each second element row, the said first position pulse and second position pulses of the output signal being emitted in the respective first and second channels corresponding to the first and second element rows in which the particular scintillation element is located.

The interpolator means may comprise a respective pulse amplitude analyzer for each detector row, each pulse amplitude analyzer having a plurality of outputs, one for each said predetermined amplitude range, and respective common gating means common to the pulse amplitude analyzers of adjacent rows, at least those outputs of the analyzers of adjacent rows which do not correspond to the maximum predetermined amplitude level being connected to the respective common gating means, each respective common gating means having at least one said output channel.

Each common gating means may comprise a plurality of logic gates each having connected to inputs thereof a different pair of analyzer outputs from said analyzers of adjacent rows.

Some of the element rows may be coincident with some of the detector rows, the output channels corresponding to these coincident element rows being adapted to receive a respective single analyzer output corresponding to the maximum predetermined amplitude range.

There may be provided summing means to sum all the simultaneously occurring detector pulses, each output channel comprising means adapted to be controlled by signals from the summing means to pass only those output signals originating from detector pulses the total summed amplitudes of which fall within a predetermined total amplitude range.

The said logic gates may each have a further input adapted to receive said signals from the summing means.

There may be provided means to direct the first position pulse and the second position pulse to core storage means or magnetic tape storage means adapted to record at a respective storage address the number of scintillations respectively produced by each scintillator element.

There may be provided means to apply deflection signals to the X and Y deflection means of a cathode-ray tube in response to the first and second position pulses of the said output signal to provide an analog display of the position of the said particular scintillation element.

Preferably, each said first output channel is connected via a respective monostable to a first converter means adapted to apply to the deflection means an analog signal of magnitude dependent upon from which said first channel a said pulse is emitted, each second output channel being connected via a respective monostable to a second converter means adapted to apply to the Y deflection means an analog signal of magnitude dependent upon from which said second channel a said pulse is emitted.

The scintillation elements may be screened from each other by opaque light reflecting walls.

The invention will be described merely by way of example with reference to the accompanying drawings in which:

FIG. 4 is a diagram partly in block schematic of an apparatus according to the invention.

FIG. 5 shows an optional additional feature of the apparatus of FIG. 3, and

FIG. 6 shows a modification of the apparatus of FIG. 4.

Figure 1:
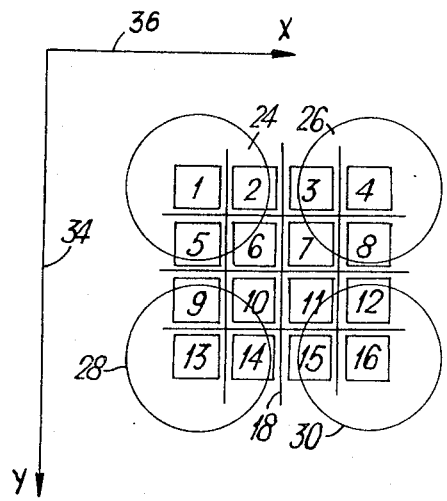
FIG. 1 is a plan diagram showing the relative position of photomultiplier tubes and crystal elements as used in carrying out the invention.
Figure 2:
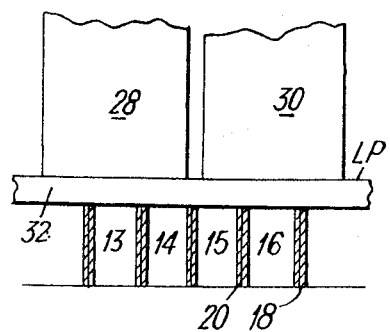
FIG. 2 is a diagrammatic sectional side elevation of the parts shown in FIG. 1.

In FIG. 1, the apparatus comprises a mosaic of crystal scintillator elements 1—16 inclusive. These may be of sodium iodide (thallium activated), caesuim iodide (thallium activated) or other suitable scintillation material. Each of the said elements is between say 0.5 inches to 1 inches long, having an exposed surface or "window" approximately 5 mm. square. The windows lie in a common plane. In some cases the elements may be circular i.e. have circular windows. Each element is optically separated from its neighbor by a suitable metal screen 18 with a packing of alumina (20, FIG. 2) or the like between the screen and its crystal to give a light-reflecting surface. The screen 18 may be of a wide range of materials but a dense metal is preferred to remove the possibility of Compton scatter between elements. Above the crystal mosaic, are positioned four detectors or photomultiplier tubes 24, 26, 28, 30, the space between the elements and the detectors being occupied by a light pipe 32 of transparent material e.g. Perspex, to prevent undue light scatter.

The field of view of each scintillation detector 24, 26, 28, 30, extends over a plurality of the scintillator elements and overlaps the field of view of neighboring detectors.

The detectors are arranged with reference to a spatial cartesian coordinate system X, Y so that they lie in a series of first rows parallel to the Y-axis 34 of the coordinate system, the rows each being defined by a respective constant X coordinate. The detectors 24, 28 lie in one such first row, the detectors 26, 30 lie in another such first row. The detectors are spaced in their respective first rows such that the detectors 24, 26 and 28, 30 respectively lie in respective second rows parallel to the X-axis 36 of the coordinate system. Thus the second rows are each defined by a respective constant Y coordinate.

The scintillation elements 1—16 are also arranged in first and second element rows, parallel to the first and second detector rows. The center-to-center spacing of the scintillator elements is appreciably less than that of the detectors. In fact, in FIG. 1 the center-to-center spacing of the elements is one-third that of the detectors. It will also be noted that the element rows (1,2,3,4) and (13,14,15,16) are coincident with the detector row (24,26), (28,30) respectively. The element rows (1, 5, 9, 13) and (4, 8, 12, 16) are respectively coincident with the detector rows (24,28), (26,30).

The detector, comprising the mosaic 1—16, photomultiplier tubes 26—30 are housed in a lead enclosure. In operation, Gamma rays from the subject under inspection are passed through a collimator (not shown) on to the scintillator elements, each hole in the collimator being directly under and in line with one element.

The apparatus can best be described by explaining its performance with reference to FIG. 4. A practical apparatus would usually comprise a large number of crystal elements (say 1,500) and many photomultiplier tubes (say 70 to 100), the area of the mosaic being say 10 inches × 10 inches and the tubes of about three-fourth inch to 1 inch diameter. However for simplicity in description the arrangement of FIG. 1 will suffice, employing 16 scintillator elements and four photomultiplier tubes.

In FIG. 4 scintillations in elements 1, 4, 13 and 16 will provide light mostly to detectors 24, 26, 28 and 30 respectively. The detectors are adjusted to have the same gain and therefore the detector pulse amplitudes or heights resulting from each of these tubes for a scintillation in its associated element will be the same and have a high relative value, say, 1 volt. A scintillation in the element 2 will result in the same amount of light output which will be shared between detectors 24 and 26, detectors 24 receiving a larger fraction of the light than detector 26. The detector pulse output from the tube 24 will be equivalent to approximately 0.7 volt and from tube 26 approximately 0.3 volt. For a scintillation in element 3 the relative pulse height outputs from detectors 24 and 26 will be reversed. In the same way, a scintillation in elements 5, 8, 9, 12, 14 or 15 will give rise to pulse outputs of 0.7 volt and 0.3 volt from detectors 24 and 26, 28 and 30, 28 and 24, 30 and 26, 28 and 30 and 30 and 28 respectively.

Figure 3:
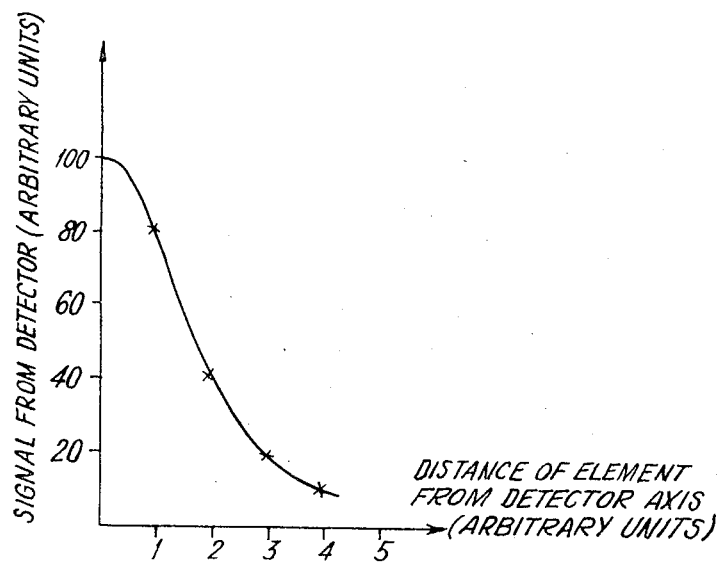
FIG. 3 is a curve illustrating the variation of detector signal with the distance of scintillation from the viewing axis of the detector.

If we now consider a scintillation in the element 6, it can be seen that the light will be effectively shared between detectors 24, 28 and 26, the relative detector pulse amplitudes being say approximately 0.5 volt, 0.3 volt and 0.3 volt. Scintillations in the elements 7, 10 or 11 will result in pulse outputs of 0.5 volt, 0.3 volt and 0.3 volt from detectors 26, 24 and 30, 28, 30 and 34, and 30, 26 and 28 respectively. FIG. 3 shows generally the way in which the detector pulse amplitude varies with the distance of a scintillation from the viewing axis of the detector for a given spacing of the detector from the plane of the scintillator element windows. Thus, each element is uniquely defined by the combination of the detector pulse heights from the four detectors.

FIG. 3 does not refer specifically to the apparatus of FIGS. 1, 2, 4, 5 and 6, which figures are not to scale, but it provides a general indication of the detector pulse amplitude variation. In order to extract the useful information contained in the detector pulses, without processing each detector pulse individually, the outputs of the detectors in each row are summed. Thus the outputs of detectors 24 and 26 are commonly connected to a line 40, FIG. 4, and the detectors 28 and 30, 24 and 28, 26 and 30, are similarly connected to respective lines 42, 44, 46.

Since the outputs of the detectors in a given row are summed, simultaneous detector pulses occurring in the detectors of the row in response to any particular scintillation will result in a row output pulse having a peak amplitude dependent on detector pulses occurring in that row. Thus, each row output pulse has a peak amplitude falling within one of several predetermined amplitude ranges. The peak amplitude of a row output pulse is thus indicative of the distance of the scintillation causing the pulse from the row of detectors producing the row output pulse. Since each scintillation will produce row output pulses from at most four rows of detectors it will be appreciated that the row output pulses indicate the position of the particular scintillation element in which any particular scintillation occurs.

Each line 40, 42, 44, 46 is connected to a respective charge sensitive amplifier 50, 52 and 54, 56, respectively, followed by a 4-level pulse height or amplitude analyzer 58, 60 and 62, 64 respectively, the gate levels thereof being set to correspond to 1 volt +20 percent, −5 percent volt +25 percent −5 percent volt +30 percent −5 percent volt [±50 percent]. A pulse of a standard height will be generated at an output of a pulse height analyzer only if it falls within the gate width of a level.

Respective common gating means are provided for each pair of pulse height analyzers associated with adjacent rows of detectors. Thus, the pulse height analyzers 58, 60 have associated therewith common gating means constituted by AND or coincidence gates 66, 68, 70, 72. It will be seen that only the 0.7, 0.5 and 0.3 volt outputs of the pulse height analyzers 58, 60 are fed to the input of the AND gates, the 1.0 volt outputs being used directly as some of several output channels discussed hereafter.

Each AND gate 66, 68, 70, 72 has connected thereto a different pair of analyzer outputs, one from each of the analyzers 58, 60.

The AND gates 66, 68 have their outputs connected to an OR gate 74 and the AND gates 70, 72, are similarly connected to an OR gate 76. It will be seen that each OR gate 74, 76 only produces an output when the outputs from the analyzers 58, 60 are derived from a scintillation occurring in one of the element rows located between the detector rows (24, 26) and (28, 30). For example, an output from the gate 74 will only occur in response to a scintillation in one of elements 5, 6, 7, or 8.

An exactly analogous common gating means is provided for the pulse height analyzers 62, 64, the AND and OR gates being indicated at 80, 82 84, 86 and 88, 90 respectively, the 1.0 volt outputs of the analyzers being used directly as output channels.

Thus there are provided four first output channels $X_1$, $X_2$, $X_3$, $X_4$ and four second output channels $Y_1$, $Y_2$, $Y_3$, $Y_4$, one channel for each row of scintillation elements.

The apparatus thus produces an output signal having an X component in one of the X output channels and a Y component in one of the Y output channels. Each output channel indicates four scintillator elements as indicated in the drawing, but the combination of any two output channels uniquely defines a single element. Thus for example a row output pulse from the row (24, 26) which triggers the 0.7 volt level of the analyzer 58 simultaneously with a row output pulse from the row (28, 30) triggering the 0.3 volt level of the analyzer 60 can only be caused by a scintillation in elements 5 or 8. If the scintillation is in element 5, the 1.0 volt level of the pulse height analyzer of the row (24, 28) will be triggered, and the location of the scintillation is defined.

Thus the pulse height analyzers and the common gating means constitute interpolator means adapted to receive the row output pulses and to derive therefrom an output signal having X and Y channel pulses. The output channels $X_1$, $X_4$, $Y_1$, $Y_4$, correspond to those scintillator rows that are coincident with the detector rows, and they are each adapted to receive a respective single analyzer output corresponding to the maximum (1.0 volt) predetermined amplitude range or level.

In an arrangement as described above, but with four detectors viewing 25 elements, the inherent positional resolution would be approximately 7.5 mm. with 1 inch diameter detectors and by using even smaller diameter detectors the resolution could be improved to say 5 mm.

The positional information from the apparatus is in digital form and can therefore be stored direct, using a core store or magnetic tape storage system. Thus, the number of scintillations produced by each scintillator element can be recorded at a respective storage address. In order to effect this, means may be provided to direct the X and Y channel pulses of each output signal to a suitable core storage means or magnetic tape storage means.

The number of scintillations produced by each scintillator element is of course indicative of the total radiation detected thereby.

An analog display can be readily achieved, as shown in FIG. 5, by using a conventional cathode ray tube 100. Each X output channel is connected via a respective monostable trigger 102, 104, 106, 108 to a first digital-to-analog converter means comprising a current summing network 110 having a bank of binary-graded resistors and an amplifier 112. The amplifier 112 is arranged to apply to the X deflection plates of the cathode-ray tube an analog signal having one of several discrete magnitudes dependent on which output channel $X_1$ to $X_4$ the X component of the output signal is emitted. An exactly similar arrangement is provided for the Y deflection plates, the monostable triggers being shown at 114, 116, 118, 120, the converter at 122 and the amplifier at 124. The output channels $X_1$ to $X_4$, $Y_1$ to $Y_4$ are also fed via respective OR gates 126, 128, and an AND gate 130 to a conventional brightup circuit 132 which increases the brilliance of the cathode-ray tube display when both X and Y components of an output signal are received.

FIG. 6 shows a modification of the apparatus of FIG. 4. The apparatus of FIG. 6 is very similar to that of FIG. 4, so only the points of difference will be described in detail.

The scintillator mosaic is shown for convenience as having 28 elements 201—228. Six photomultiplier tubes 230—235 are provided. The outputs of each detector row are fed via respective charge sensitive amplifiers 236—240, voltage amplifiers 241—245 and pulse-shaping circuits 246—250 to respective three-level pulse height analyzers 251—255.

The spacing of the scintillator elements and the field of view of the detectors is such that, for example with reference to detector 230, 231, 233 a scintillation in element 201 will give a pulse of (say) 1 volt in detector 230 alone. In response to a scintillation in element 202, pulses of 0.7 and 0.3 volts will be obtained from detectors 230, 231. A scintillation in element 209 will produce a pulse of 0.6 volts in detector 230 and 0.2 volts in detectors 231 and 233.

The gate widths of the output levels pulse height analyzers are set at 1 volt +30 percent, −5 percent volt +40 percent −5 percent volt [±50 percent].

Since the pulse height analyzers are of the three level type, the common gating means consist only of AND gates 256—260, the OR gates of FIG. 4 not being required. As in FIG. 4, each gate receives a different pair of analyzer outputs. The AND gates 256—261 control output channels $Y_2$, $Y_3$, $Y_5$, $Y_6$, $X_2$, $X_3$, corresponding to element rows located between adjacent detector rows.

The row output pulses from the detector rows (230, 231, 232) and (233, 234, 236) are summed by a further summing means including a summing junction 262 which is connected to the outputs of the charge sensitive amplifiers 239, 240. The summing junction thus sums all the detector pulses occurring simultaneously. The summed detector pulses are fed via an amplifier 264 to a single-channel analyzer 265 and a monostable 266. The single-channel analyzer produces an output signal only if the total summed amplitude of the detector pulses falls within a predetermined total amplitude range corresponding to a scintillation produced by a gamma radiation of a selected energy level.

The AND gates 256—261 each have one more input than the corresponding AND gates of the FIG. 4 apparatus. The output signal of the single-channel analyzer 265 is fed to these further inputs of the AND gates 256—261, each gate of course being such that it will only produce an output signal when an input is present at each of its input terminals. The single-channel analyzer output signal is also fed to further AND gates 267—271 which control the output channels $Y_1$, $Y_4$, $Y_7$, $X_1$, $X_4$ which each receive a single output of the maximum 1.0 volt level from one of the analyzers 251—255. These maximum-level outputs correspond to scintillator element rows that are coincident with detector rows. Thus, output signals are also only produced in these channels in response to scintillations produced by a gamma radiation of a selected energy level.

Thus, spurious output signals due to scintillations produced by stray radiations are avoided.

The monostable 266 produces pulses which are fed to the pulse-shaping circuits 246—250 to control the operation thereof. The pulse-shaping circuits 246—250 ensure that the pulses received by the pulse height analyzers are of a consistent shape, despite the slight variations in the detector pulses produced by different detectors.

Various modifications may be made in the apparatus for carrying the principle of the invention into practical effect. For example the scintillator elements may have circular windows and in some cases tubes of different diameter may be used to view different overlapping areas of the crystal matrix.

The relative sizes and/or spacing of the scintillator elements may be varied. For example, if the center-to-center spacing of the elements is half that of the detectors, then there will be only one element row lying between each detector row. The common gating means for each pair of adjacent detector rows would then have only one output channel. All the outputs of pulse height analyzers of the said pair of detector rows may be connected to the common gating means of the pair, for example, if the arrangement is such that no scintillator rows are coincident with either of the detector rows forming an adjacent pair, detector rows would be connected to the common gating means of the pair.

Of course, features such as shown in FIG. 5 may be incorporated in the apparatus of FIG. 6 if desired, and a core store or magnetic tape store may be provided as previously described.

I claim:

1. A gamma radiation indicating or detecting apparatus comprising a mosaic of scintillator crystal elements each adapted to produce a scintillation of given intensity when a gamma ray of given energy level is incident thereon, means optically screening the elements from each other, the elements being arranged in a series of first rows parallel to a first axis and in a series of second rows parallel to a second axis intersecting the first, a plurality of scintillation detectors arranged to view said elements, the detectors being more widely spaced than the elements and being arranged in a series of first and second detector rows parallel to the first and second element rows, each detector being in both a first and a second detector row thereby to respond to plural elements in both first and second element rows, summing means to sum the outputs of the detectors in each detector row, and interpolator means to process the summed outputs of each row of detectors in response to a scintillation of given intensity to provide an output signal having a first position pulse and a second position pulse which respectively define the first and second element rows containing the element in which said scintillation occurred.

2. Apparatus as claimed in claim 1 wherein the interpolator means has a plurality of first output channels, one for each first element row, and a plurality of second output channels, one for each second element row, the said first position pulse and second position pulse of the output signal being emitted in the respective first and second channels corresponding to the first and second element rows in which the particular scintillation element is located.

3. A gamma radiation indicating or detecting apparatus comprising a mosaic of scintillator crystal elements each adapted to produce a scintillation of given intensity when a gamma ray of given energy level is incident thereon, means optically screening the elements from each other, the elements being arranged in a series of first rows parallel to a first axis and in a series of second rows parallel to a second axis intersecting the first, a plurality of scintillation detectors arranged to view said elements, the detectors being more widely spaced than the elements and being arranged in a series of first and second detector rows parallel to the first and second element rows, each detector being in both a first and second detector row thereby to respond to plural elements in both first and second element rows, a plurality of first output channels, one for each first element row, a plurality of second output channels, one for each second element row, and interpolator means to process the summed outputs of each row of detectors in response to a scintillation of given intensity to provide a position pulse in one of the first channels and a position pulse in one of the second channels, identifying the element in which the said scintillation occurred.

4. Apparatus as claimed in claim 3 wherein the interpolator means comprises a respective pulse amplitude analyzer for each detector row, each pulse amplitude analyzer having a plurality of outputs, one for each said predetermined amplitude range, and respective common gating means common to the pulse amplitude analyzers of adjacent rows, at least those outputs of the analyzers of adjacent rows which do not correspond to the maximum predetermined amplitude level being connected to the respective common gating means, each respective common gating means having at least one said output channel.

5. Apparatus as claimed in claim 4 wherein each common gating means comprises a plurality of logic gates each having connected to inputs thereof a different pair of analyzer outputs from said analyzers of adjacent rows.

6. Apparatus as claimed in claim 4 wherein some of the element rows are coincident with some of the detector rows, the output channels corresponding to these coincident element rows being adapted to receive a respective single analyzer output corresponding to the maximum predetermined amplitude range.

7. Apparatus as claimed in claim 1, comprising further summing means to sum all the simultaneously occurring detector pulses, each output channel comprising means adapted to be controlled by signals from the further summing means to pass only those output signals originating from detector pulses, the total summed amplitudes of which fall within a predetermined total amplitude range.

8. Apparatus as claimed in claim 1 comprising a magnetic storage means, and means to direct the first position pulse and the second position pulse to said storage means the storage means being adapted to record at a respective storage address the number of scintillations respectively produced by each scintillator element.

9. Apparatus as claimed in claim 3 wherein the elements lie in respective first and second element rows parallel to said first and second axes which are orthogonal.

10. Apparatus as claimed in claim 9 comprising a cathode-ray tube, and means to apply deflection signals to the first and second deflection means of said cathode-ray tube in response to the X and Y position pulses of the said output signal to provide an analog display of the position of the said particular scintillation element.

11. Apparatus as claimed in claim 1 in which the means optically screening the scintillator elements comprise opaque light-reflecting walls.

12. Apparatus as claimed in claim 10 wherein the apparatus further comprises a first converter means, a respective monostable connecting each first output channel thereto, the first converter means being adapted to apply to the X deflection means an analog signal of magnitude dependent upon from which said first channel a said pulse is emitted, and a second converter means, a respective monostable connecting each second output channel thereto, the second converter means being adapted to apply to the Y deflection means an analog signal of magnitude dependent upon from which said second channel a said pulse is emitted.

13. In a device for detecting gamma rays, the combination comprising
a plurality of element means arranged in $m$ columns and $n$ rows for producing a scintillation in one of said elements when a gamma ray is incident thereon, the rows and columns intersecting each other,
detector means arranged in $x$ columns and $y$ rows, each detector positioned to detect scintillations in more than one of said elements, the rows and columns intersecting each other,
means for summing the outputs of said detector means and producing first and second sets of output signals, the first set composed of $x$ signals, each proportional to the sum of said outputs in one of said columns, the second set composed of $y$ signals, each proportional to the sum of said outputs in one of said rows,
first logic means connected to receive said first set of $x$ output signals for producing a first position signal,
second logic means connected to receive said second set of $y$ output signals for producing a second position signal,
said first and second position signals indicating which of said elements received a gamma ray.